United States Patent [19]
Peck

[11] 3,923,348
[45] Dec. 2, 1975

[54] FRICTION BEARING

[75] Inventor: James A. Peck, Houston, Tex.

[73] Assignee: Reed Tool Company, Houston, Tex.

[22] Filed: Mar. 13, 1974

[21] Appl. No.: 450,900

[52] U.S. Cl. ............................... 308/8.2; 175/372
[51] Int. Cl.² .................................... F16C 19/00
[58] Field of Search............ 308/8.2, 237 R, 237 A, 308/DIG. 8, 239; 175/371, 372; 75/153

[56] References Cited
UNITED STATES PATENTS 3,721,307   3/1973   Nayd................................ 308/8.2 X
3,823,030   7/1974   Hudson............................ 308/8.2 X Primary Examiner—M. Henson Wood, Jr.
Assistant Examiner—Gene A. Church
Attorney, Agent, or Firm—Vinson, Elkins Searls, Connally & Smith

[57] ABSTRACT

A friction bearing, particularly useful in drill bits, including a bushing having a borided wear surface, and a method of making the same.

5 Claims, 4 Drawing Figures

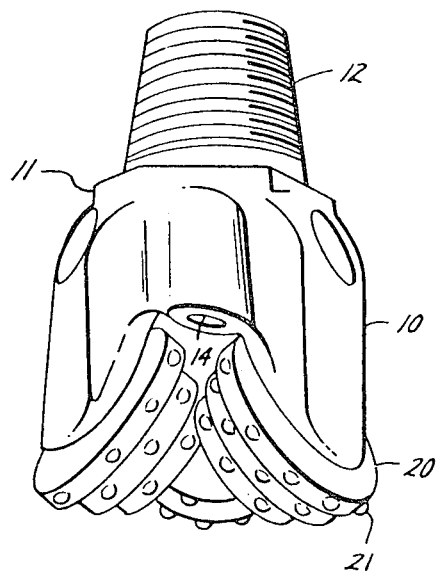
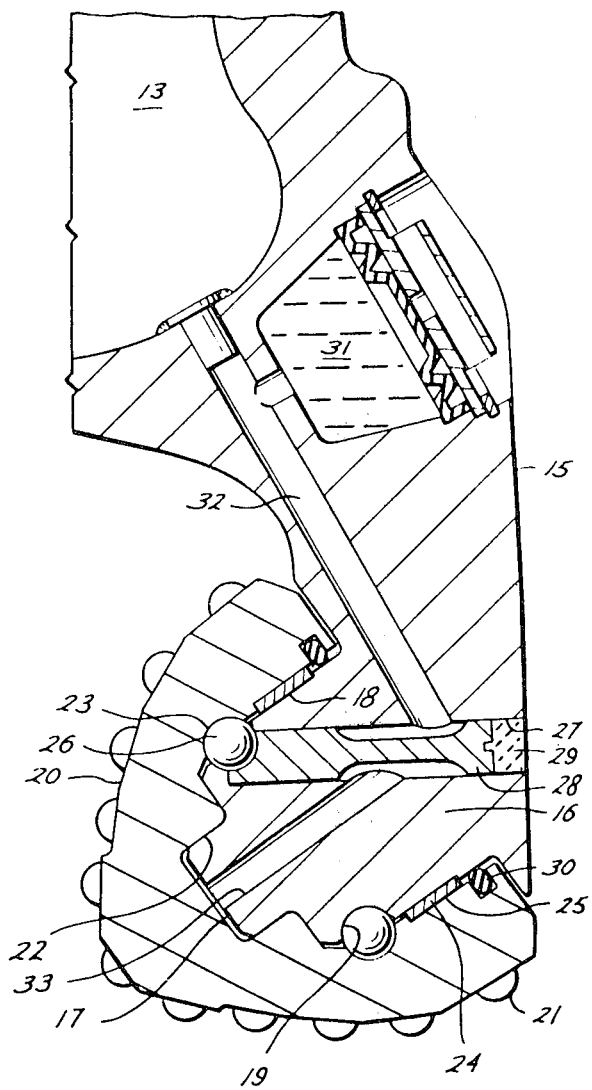
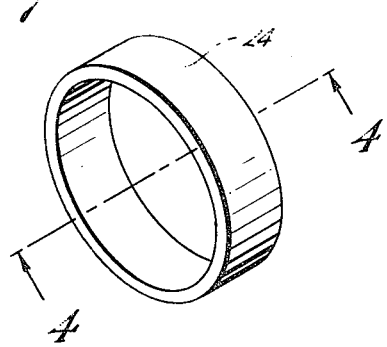
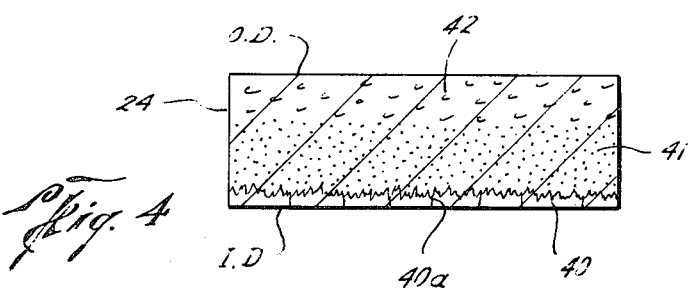

FRICTION BEARING

BACKGROUND

This invention relates to improved friction bearings of large load capacity for roller drill bits.

Some prior art steel bushings have been subject to severe wear and seizing, which can result in relatively short friction bearing life.

SUMMARY

This invention is concerned with a new and improved friction bearing for roller drill bits which comprises a metallic bushing having a borided wear surface which has superior wear characteristics and which is not likely to seize during the drilling operation.

While described here in connection with roller drill bits, it is apparent that the bearing of the invention can be used in other equipment or machinery employing relatively rotatable members.

DRAWINGS

FIG. 1 is a side elevational view of a roller cutter type earth drilling bit.

FIG. 2 is a partial, detailed sectional view of the drill bit showing its bearing structure.

FIG. 3 is a pictorial view of the friction bearing bushing member.

FIG. 4 is an enlarged, sectional view of the bushing taken along line 4—4 of FIG. 3 showing somewhat schematically the structure of the material comprising the bushing.

THE PREFERRED EMBODIMENT

Referring to FIGS. 1 and 2, a roller cutter earth drilling bit is shown generally at 10 comprising a steel head 11 having a threaded shank 12 extending upwardly and adapted to be threadedly connected to the lower end of a drill stem (not shown). The head 11 has a chamber 13 and a nozzle 14 to receive and discharge drilling fluid pumped downwardly through the drill stem in the usual manner. Steel legs 15 depend from head 11 and each has an inwardly and downwardly extending bearing shaft 16. A bearing pin 17 may be provided on the shaft 16. A ball race 19 is located on the shaft 16 between the pin 17 and a cylindrical bearing portion 18.

A steel cutter 20, having cutting elements 21, such as tungsten carbide inserts, surrounds the shaft 16 and has a friction race 22 engaging the pin 17, and a ball race 23 which is complementary to the race 19 on the shaft 16. A bearing bushing or sleeve 24 is pressed into a bore 25 of the cutter 20 and frictionally engages the cylindrical bearing portion 18 of the shaft 16.

Ball bearings 26 are inserted into the ball races 19 and 23 through bore 27 in the shaft 16, and a ball retaining plug 28 is secured in the bore 27 as by welding as shown at 29. A grease seal 30 is provided between the cutter 20 and the shaft 16.

Lubrication is supplied to the interior of the cutter 20 from reservoir 31, through passageway 32, around the plug 28 and through passageway 33 in the shaft 16.

The bushing 24 may be made of AISI 4815 steel having a finished thickness of 0.120 inches for example. The bushing may be machined leaving an additional 0.200 inches thickness on the outside diameter, after which the bushing is carburized to a depth of approximately 0.070 inches. The additional 0.200 inches may then be machined away from the outside diameter of the bushing to remove the carburized portion or case therefrom.

If desired, the outside diameter of the bushing 24 may be made initially more nearly to the desired finished dimension, after which a case preventive or stop-off paint may be applied to the outside diameter surface of the bushing to prevent carburization thereof.

The bushing may then be borided by heating it in an electrolytic boron fluoride bath at approximately 1,500°F. for about 48 hours to produce a boride diffusion metal layer or case of about 0.007 inches, after which the bushing may be oil quenched from 1,550°F. to harden the carburized case and core and tempered at about 375°F.

The boride case comprises an iron-boron alloy and is very hard and expensive and time-consuming to apply so that it is important to determine the exact final size the bushing must be before boriding. And since only 0.007 inches is boride case, the finish grinding of the inside diameter of the bushing must be held to a minimum lest the boride case be ground completely away.

The bushing 24 may be approximately 0.018 inches larger in outside diameter than the bore 25 of the cutter 20 so that it may be pressed into place. This press fit maintains the bushing 24 in hoop compression which is important because of the hard and brittle nature of the boron case, which may, even before use, display some hairline cracks such as shown at 40a.

Referring to FIG. 4, an enlarged section of the bushing 24 is shown having a boron case or diffused layer 40 which may have a Rockwell A hardness of about 89. There is a carbon diffused layer 41 underlying the boron case 40, ranging in hardness from about 58 – 60 Rockwell C near the boron to about 40 Rockwell C near the non-carbon diffused layer 42, which is the core material comprising ferrite and martensite having a hardness of about 35 Rockwell C.

When a section of the bushing 24, such as shown in FIG. 4, is given a Nital etch (5% $HNO_3$ in alcohol), the boride case 40 appears light or white, the carbon diffusion layer 41 appears dark and the core layer 42 is mixed dark and light.

I believe that providing a carburized layer directly beneath the boron case better supports the same and the press fit of the bushing maintains the brittle boron case in compression. It also is important to provide a method of making the bushing, such as previously described, so that the different stratas or layers of the bushing may be correctly and accurately formed, treated and ground to achieve the desired bushing characteristics and operating relationship of the bushing with its associated part.

The cylindrical bearing portion 18 of the shaft 16 mates with the bushing 24 to provide the superior friction bearing of the invention. The bearing 18 may have thereon Stellite which may include tungsten, chromium and cobalt and lesser amounts of carbon, manganese, silicon, nickel, molybdenum, boron and iron which may be supplied as a fired deposit. It will be understood that the bearing 18 may comprise other suitable bearing materials.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. A friction bearing having relatively rotatable members including:
   a metallic bushing having a borided inner wear surface.

2. A friction bearing according to claim 1 wherein the bushing is pressed into one of said relatively rotatable members so that the bushing is maintained in hoop compression.

3. A friction bearing according to claim 1 wherein a carbon diffusion layer underlies the said borided inner wear surface.

4. A friction bearing according to claim 3 wherein a non-diffused core layer underlies the said carbon diffusion layer.

5. A friction bearing for a drill bit roller cutter bore comprising:
   a metallic bushing pressed into said bore,
   the inner diameter surface of the bushing comprising a boron diffusion layer,
   a carbon diffusion layer underlying said boron diffusion layer, and
   a non-diffused core layer underlying the said carbon diffusion layer.

* * * * *